US011674558B2

(12) United States Patent
Nakano et al.

(10) Patent No.: US 11,674,558 B2
(45) Date of Patent: Jun. 13, 2023

(54) HYDRAULIC SHOCK ABSORBER AND DAMPING FORCE GENERATION MECHANISM

(71) Applicant: Showa Corporation, Gyoda (JP)

(72) Inventors: Gota Nakano, Gyoda (JP); Tomoaki Shinozaki, Gyoda (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 95 days.

(21) Appl. No.: 16/817,137

(22) Filed: Mar. 12, 2020

(65) Prior Publication Data

US 2020/0208707 A1    Jul. 2, 2020

Related U.S. Application Data

(63) Continuation-in-part of application No. PCT/JP2017/036187, filed on Oct. 4, 2017.

(51) Int. Cl.
*F16F 9/348* (2006.01)
*F16F 9/18* (2006.01)

(52) U.S. Cl.
CPC ........... *F16F 9/3488* (2013.01); *F16F 9/185* (2013.01); *F16F 9/3484* (2013.01); *F16F 9/3482* (2013.01)

(58) Field of Classification Search
CPC ...... F16F 9/3488; F16F 9/3484; F16F 9/3485; F16F 9/3487; F16F 9/3214; F16F 9/3482; F16K 31/0696
See application file for complete search history.

(56) References Cited

U.S. PATENT DOCUMENTS 4,088,207 A * 5/1978 Kato .................. F16F 9/34
188/282.5
4,895,229 A * 1/1990 Kato .................. F16F 9/3484
188/282.6
(Continued)

FOREIGN PATENT DOCUMENTS

CH          472601 A *   5/1969  ............ F16F 9/3485
CN       104343766 A     2/2015
(Continued)

OTHER PUBLICATIONS

International Search Report dated Dec. 19, 2017 for the corresponding PCT International Patent Application No. PCT/JP2017/036187.

*Primary Examiner* — Robert A. Siconolfi
*Assistant Examiner* — Stephen M Bowes
(74) *Attorney, Agent, or Firm* — Leason Ellis LLP; Edward J. Ellis; Melvin C. Garner

(57) ABSTRACT

The hydraulic shock absorber includes: a first cylinder containing fluid; a piston body including extension-side oil paths permitting flow of oil along with relative movement of the piston rod in the axial direction of the first cylinder; and an extension-side damping valve configured to open and close the extension-side oil paths of the piston body. The extension-side damping valve includes: a valve plate configured to close the extension-side oil paths by covering them and open them by deforming under pressure of oil; and a preload member configured to apply a preload to the valve plate. The preload member includes: a ring-shaped portion; and axis alignment portions configured to protrude from an outer periphery of the ring-shaped portion and contact the piston body to thereby perform axis alignment.

10 Claims, 14 Drawing Sheets

(56) References Cited

U.S. PATENT DOCUMENTS

| | | | |
|---|---|---|---|
| 4,964,493 A * | 10/1990 | Yamaura | F16F 9/3484 188/282.6 |
| 5,316,113 A * | 5/1994 | Yamaoka | F16F 9/3484 188/282.6 |
| 5,325,942 A | 7/1994 | Groves et al. | |
| 5,529,154 A * | 6/1996 | Tanaka | F16F 9/3484 188/282.6 |
| 2001/0009214 A1 | 7/2001 | Tanaka | |
| 2004/0211633 A1* | 10/2004 | Kajino | F16F 9/3484 188/322.15 |
| 2005/0056504 A1 | 3/2005 | Holiviers | |
| 2014/0060315 A1 | 3/2014 | Mori | |
| 2015/0034182 A1 | 2/2015 | Ashiba | |
| 2016/0082803 A1 | 3/2016 | Dunaway et al. | |
| 2016/0356335 A1 | 12/2016 | Nomura et al. | |
| 2017/0058987 A1 | 3/2017 | Nakano | |
| 2017/0184245 A1 | 6/2017 | Nakano | |
| 2017/0248188 A1 | 8/2017 | Senou | |

FOREIGN PATENT DOCUMENTS

| | | | |
|---|---|---|---|
| CN | 106246791 A | 12/2016 | |
| CN | 106481720 A | 3/2017 | |
| CN | 106917841 A | 7/2017 | |
| CN | 107120379 A | 9/2017 | |
| EP | 1118793 A3 | 1/2002 | |
| JP | 60-099341 U | 7/1985 | |
| JP | 01-149035 U | 10/1989 | |
| JP | 02-101144 U | 8/1990 | |
| JP | 2000-000009 U | 1/2000 | |
| JP | 2006-070991 A | 3/2006 | |
| JP | 2007-506055 A | 3/2007 | |
| JP | 2014-047289 A | 3/2014 | |
| KR | 100880165 B1 * | 1/2009 | F16F 9/3485 |

\* cited by examiner

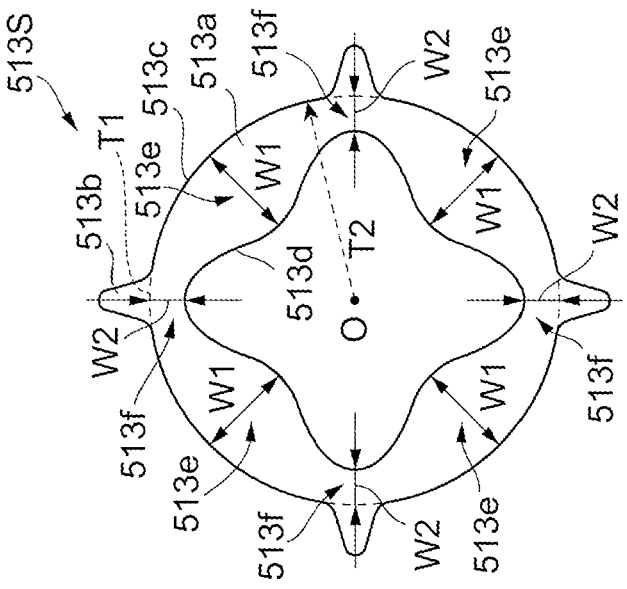
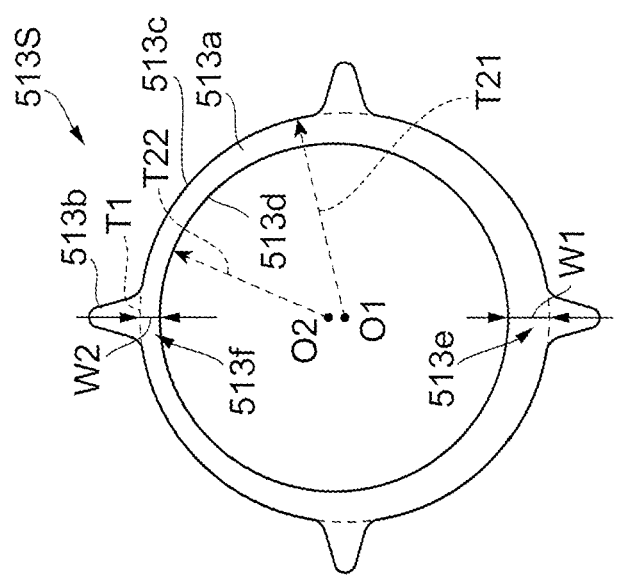

HYDRAULIC SHOCK ABSORBER AND DAMPING FORCE GENERATION MECHANISM

CROSS-REFERENCE TO RELATED APPLICATIONS

This application is a continuation-in-part of PCT application No. PCT/JP2017/036187 filed on Oct. 4, 2017, the content of which is incorporated herein by reference.

FIELD OF THE INVENTION

The present invention relates to a hydraulic shock absorber and a damping force generation mechanism.

BACKGROUND OF THE INVENTION

A suspension device of a vehicle such as an automobile includes a hydraulic shock absorber using a damping force generator. The hydraulic shock absorber is designed to appropriately mitigate vibrations transmitted from a road surface to the vehicle during driving and improve driving comfort and steering stability.

The hydraulic shock absorber includes a channel forming part formed with channels in which fluid flows along with movement of a rod relative to a cylinder. The hydraulic shock absorber further includes an opening and closing part configured to open and close the channels using pressure of the fluid and thereby control flow of the fluid.

For example, Japanese Unexamined Patent Application Publication (Translation of PCT Application) No. 2007-506055 discloses a piston movably provided inside a cylinder and partitioning the cylinder and a rod member connected to the piston, and discloses that a damping force is generated by applying resistance to flow of liquid resulting from movement of the piston.

Technical Problem

When an opening and closing member that opens the channels by deforming under pressure of the fluid is used for the opening and closing part, the opening and closing member tends to suddenly open. This may cause sudden changes in the damping force and resultant noise. To prevent this, a preload member may be provided to apply a preload to the opening and closing member. Applying a preload to the opening and closing member may prevent the opening and closing member from suddenly opening.

However, conventional preload members are complicated in structure and involve increased manufacturing steps.

An object of the present invention is to provide a hydraulic shock absorber including a preload member that has a simple structure and involves reduced manufacturing steps.

SUMMARY OF THE INVENTION

Solution to Problem

With this object in view, an aspect of the present invention relates to a hydraulic shock absorber including: a cylinder containing fluid; a channel forming part including a channel configured to permit flow of the fluid along with relative movement of a rod in an axial direction of the cylinder; and an opening and closing part configured to open and close the channel of the channel forming part, wherein the opening and closing part includes: an opening and closing member configured to close the channel by covering the channel and open the channel by deforming under pressure of the fluid; and a preload member configured to apply a preload to the opening and closing member, the preload member including a ring-shaped portion and axis alignment portions, the ring-shaped portion being in a ring shape, the axis alignment portions being configured to protrude from an outer periphery of the ring-shaped portion and contact the channel forming portion to thereby perform axis alignment.

Advantageous Effects of Invention

According to an aspect of the present invention, it is possible to provide a hydraulic shock absorber including a preload member that has a simple structure and involves reduced manufacturing steps.

BRIEF DESCRIPTION OF THE DRAWINGS

FIGS. 7A to 7C show modifications of the preload plate.

DETAILED DESCRIPTION OF THE INVENTION

An embodiment of the present invention will be described below with reference to the attached drawings.

Figure 1:
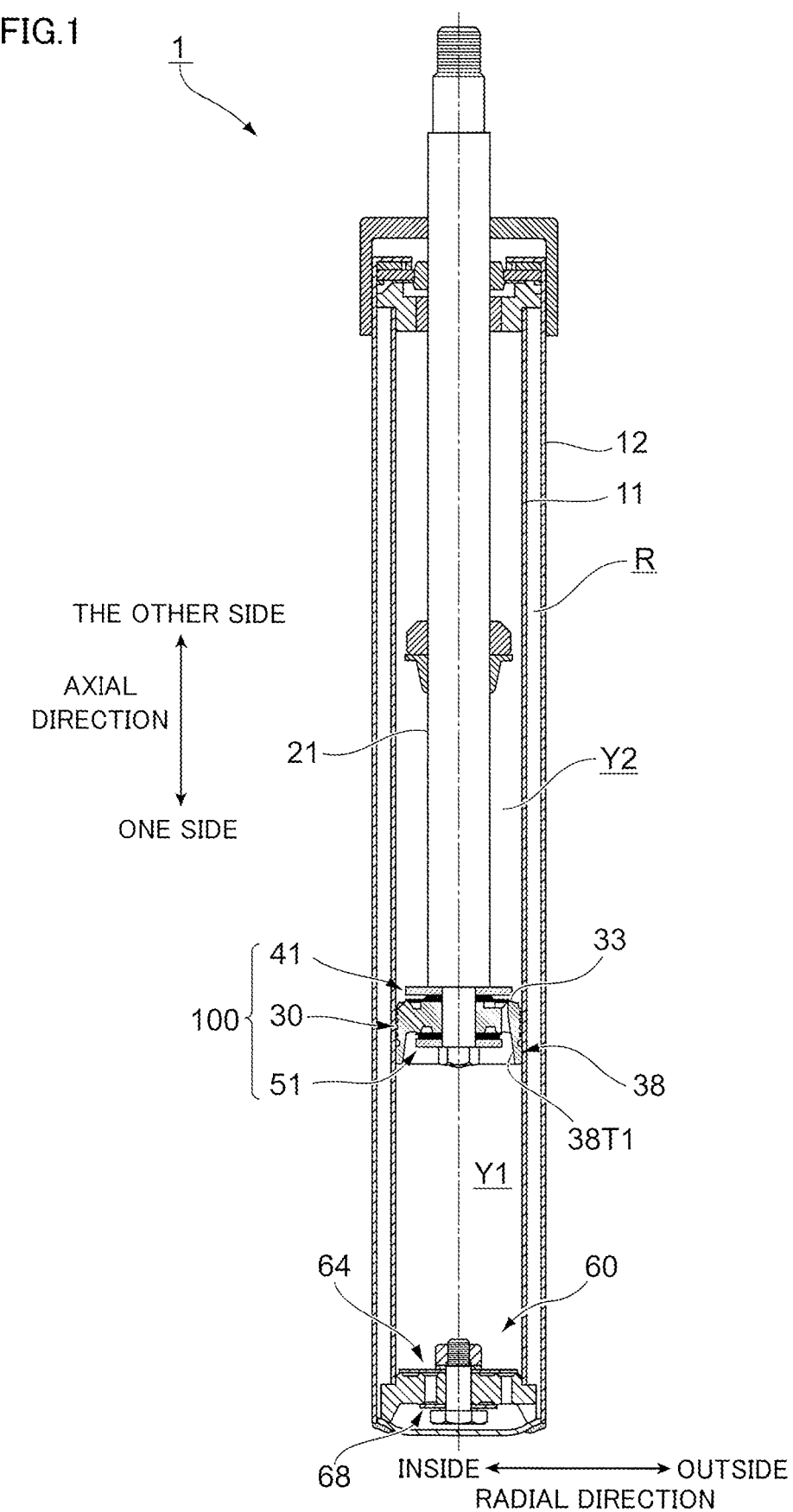
FIG. 1 shows an overall configuration of a hydraulic shock absorber of the present embodiment.

FIG. 1 shows an overall configuration of a hydraulic shock absorber 1 of the present embodiment.

Figure 2A:
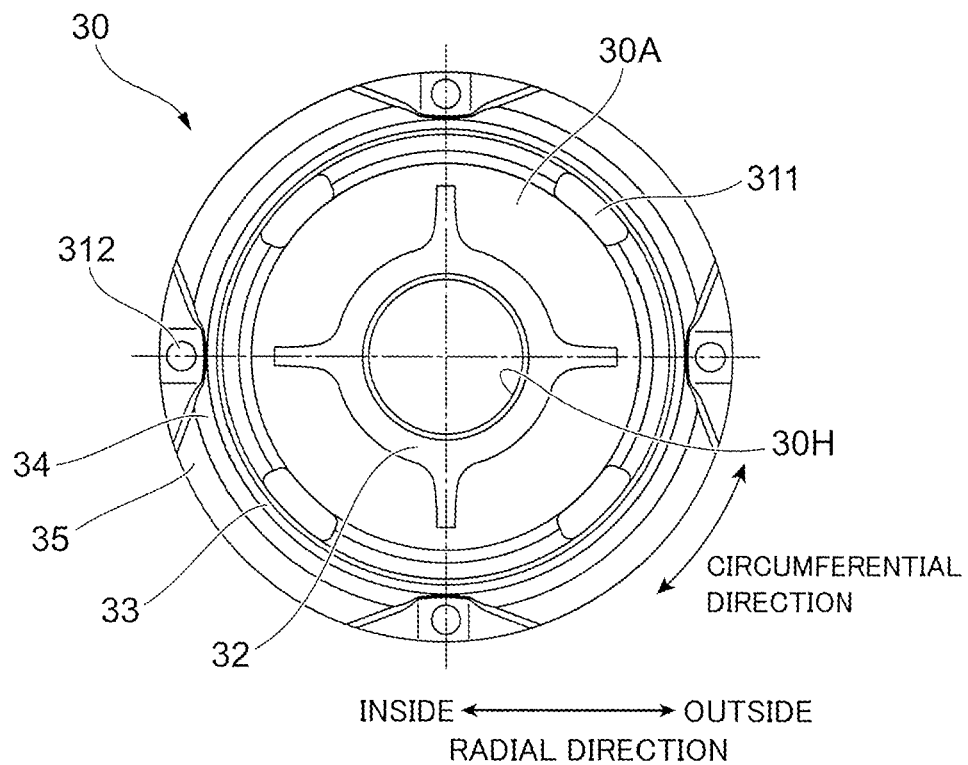
FIGS. 2A and 2B are a top view and a bottom view, respectively, of a piston body of the present embodiment.
Figure 2B:
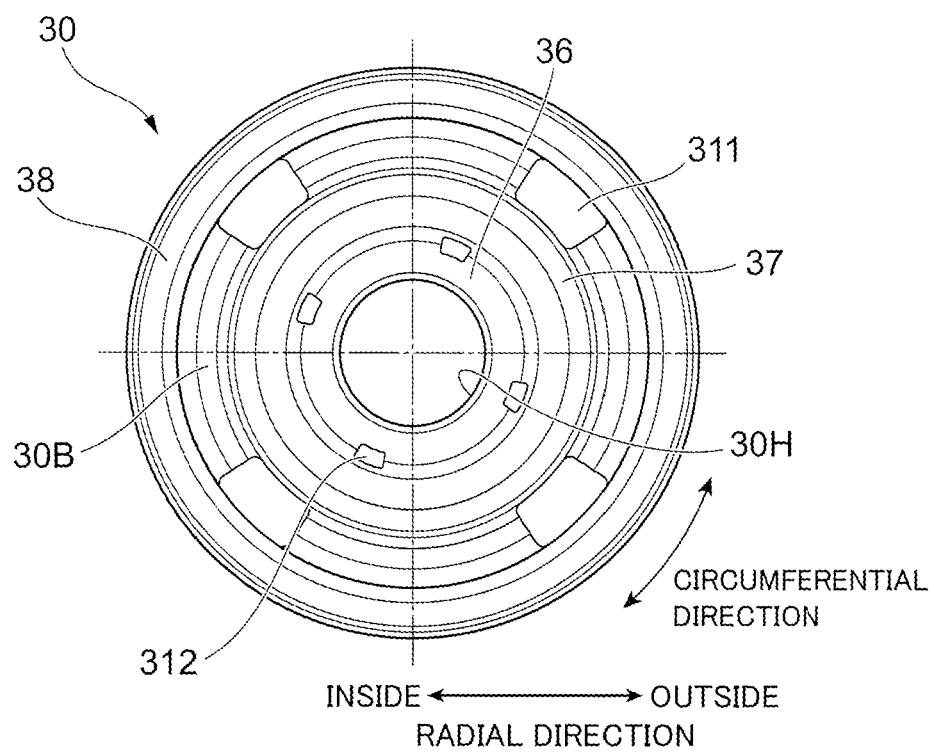

FIGS. 2A and 2B are a top view and a bottom view, respectively, of a piston body 30 of the present embodiment. FIG. 2A is a top view of the piston body 30 as viewed from the other side. FIG. 2B is a bottom view of the piston body 30 as viewed from one side.

Figure 3:
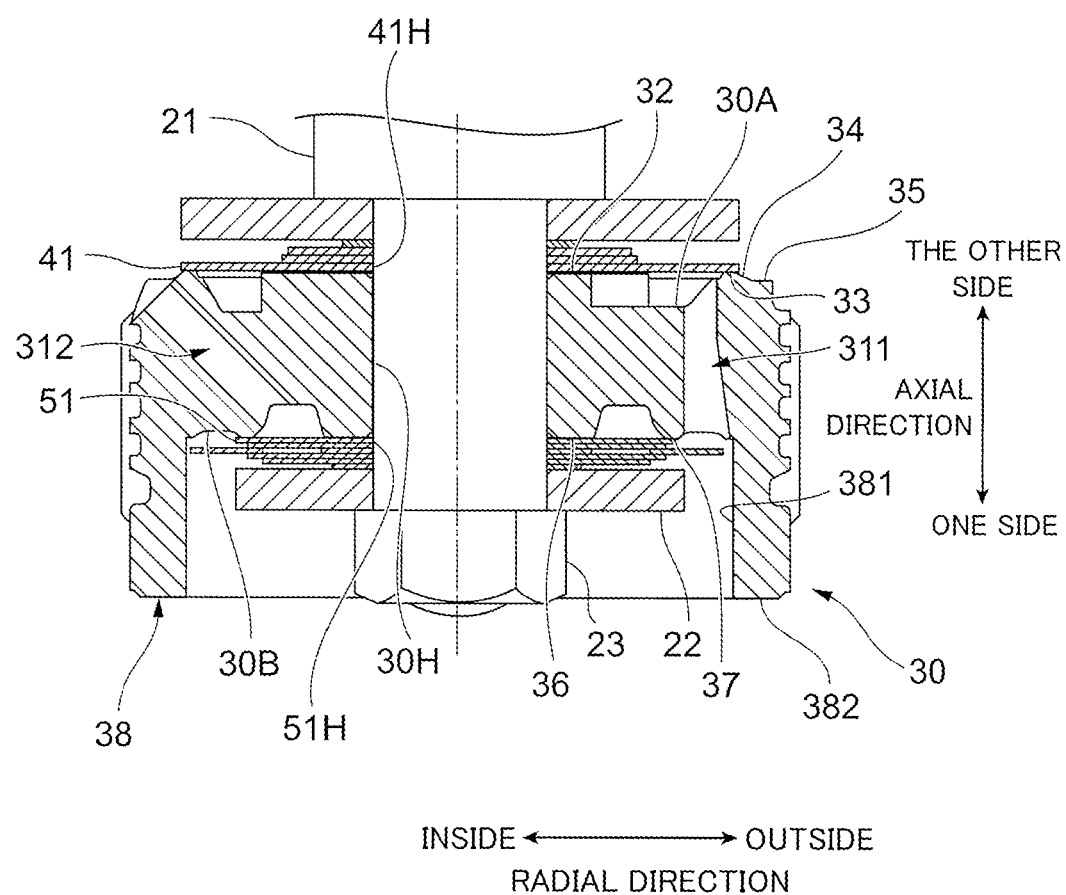
FIG. 3 is a sectional view of the piston body of the present embodiment.

FIG. 3 is a sectional view of the piston body 30 of the present embodiment. FIG. 3 also shows a piston rod 21, a compression-side damping valve 41, and an extension-side damping valve 51.

Figure 4:
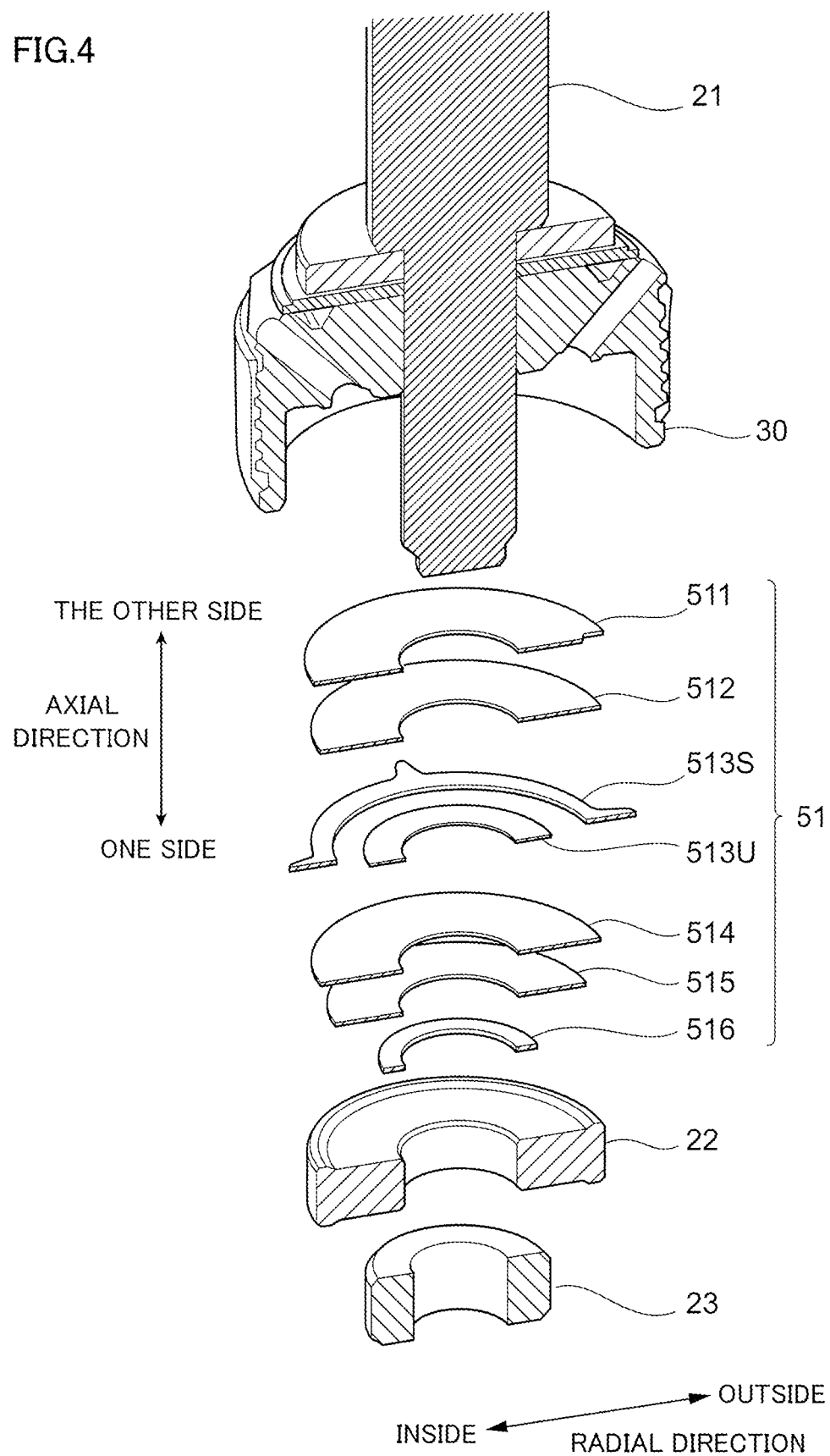
FIG. 4 is an exploded perspective sectional view of an extension-side damping valve.

FIG. 4 is an exploded perspective sectional view of the extension-side damping valve 51.

Figure 5:
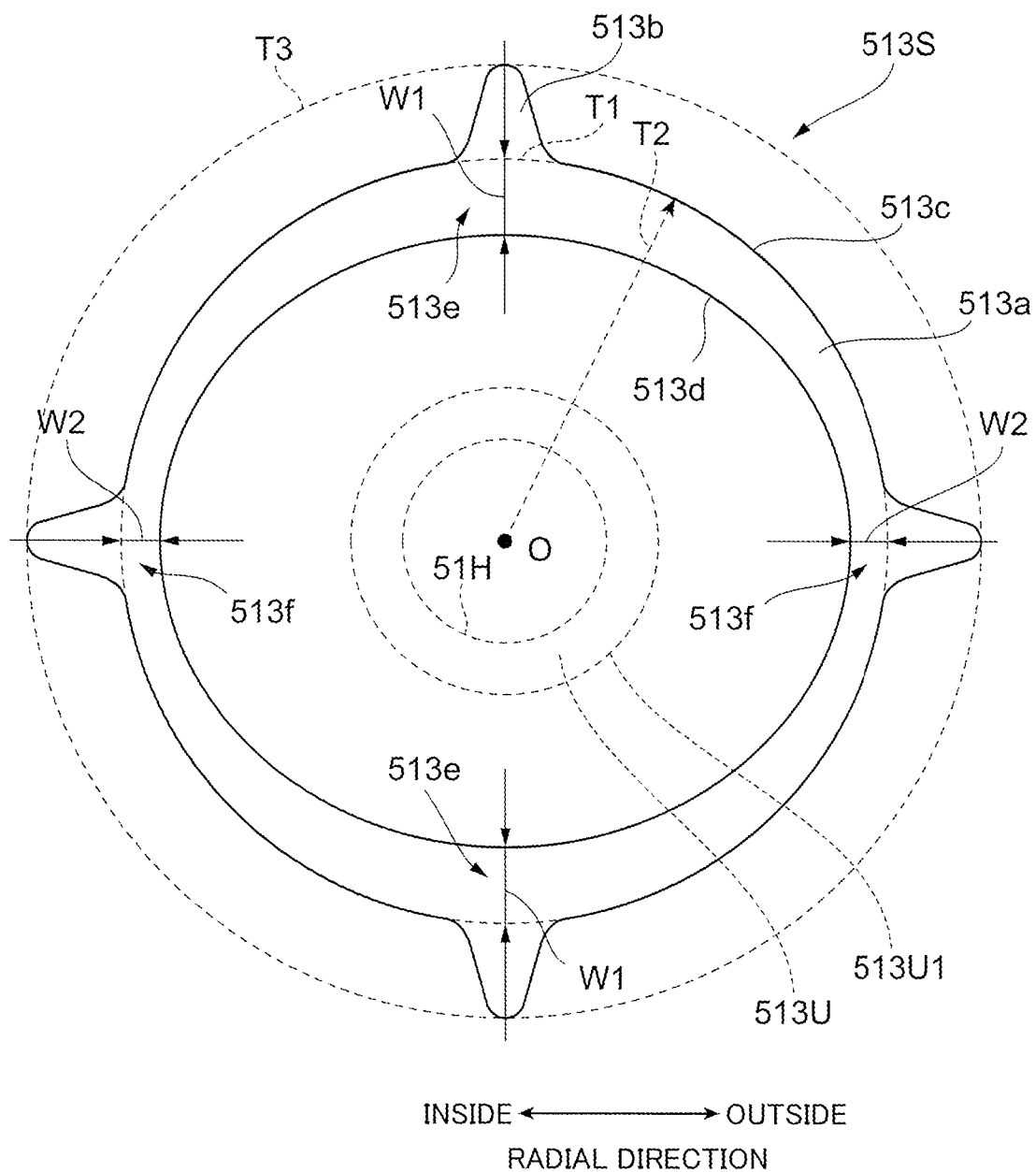
FIG. 5 shows a preload plate.

FIG. 5 shows a preload plate 513S.

In the following description, a longitudinal direction of the hydraulic shock absorber 1 shown in FIG. 1 may be referred to as an "axial direction". In the axial direction, a lower side of the hydraulic shock absorber 1 may be referred to as "one side", and an upper side the hydraulic shock absorber 1 may be referred to as the "other side". Also, the left-right direction of the hydraulic shock absorber 1 shown in FIG. 1 may be referred to as a "radial direction". In the radial direction, the side radially closer to the center axis may be referred to as "inside in the radial direction", and the side radially away from the center axis may be referred to as "outside in the radial direction".

[Overall Configuration of the Hydraulic Shock Absorber 1]

First, an explanation will be given of an overall configuration of the hydraulic shock absorber 1.

As shown in FIG. 1, the hydraulic shock absorber 1 includes a first cylinder 11 containing oil and a second cylinder 12 disposed on the outside of the first cylinder 11 in the radial direction. The hydraulic shock absorber 1 further includes a piston rod 21 configured to move in the axial direction and a piston unit 100 (an example of the damping force generation mechanism) disposed on the one side of the piston rod 21 and configured to move within the first cylinder 11. The hydraulic shock absorber 1 further includes a bottom valve unit 60 on the one side of the first cylinder 11.

The hydraulic shock absorber 1 includes: the first cylinder 11 (an example of the cylinder) containing oil (an example of the fluid); a piston body 30 (an example of the channel forming part and the piston body) including extension-side oil paths 312 (an example of the channel) in which oil flows along with relative movement of the piston rod 21 (an example of the rod) in the axial direction of the first cylinder 11; and an extension-side damping valve 51 (an example of the opening and closing part) configured to open and close the extension-side oil paths 312 of the piston body 30. As shown in FIGS. 3 to 5, the extension-side damping valve 51 includes a valve plate 511 (an example of the opening and closing member) and a preload plate 513S (an example of the preload member) for applying a preload to the valve plate 511. The valve plate 511 is configured to cover and close the extension-side oil paths 312 and to open the extension-side oil paths 312 by deforming under pressure of oil. The preload plate 513S includes a ring-shaped portion 513*a* (an example of the ring-shaped portion) formed in a ring shape and axis alignment portions 513*b* (an example of the axis alignment portion) protruding from an outer periphery of the ring-shaped portion 513*a* and contacting the piston body 30 for axis alignment.

Each of the above components will be described in detail below.

The first cylinder 11 is formed in a cylindrical shape. The second cylinder 12 is formed in a cylindrical shape and co-axial with the first cylinder 11. The second cylinder 12 forms a reservoir chamber R, which is a cylindrical space, between the first cylinder 11 and the second cylinder 12. The reservoir chamber R contains oil. Gas is encapsulated on the other side of the reservoir chamber R.

A part of the piston rod 21 at the one side goes inside of the first cylinder 11, and the rest of the piston rod 21 at the other side exposes to the outside of the first cylinder 11. The piston rod 21 is provided with a piston unit 100 at its end on the one side.

The piston unit 100 moves in the axial direction along with movement of the piston rod 21. The piston unit 100 includes: the piston body 30 formed with multiple oil paths (described later) penetrating in the axial direction; a compression-side damping valve 41 on the other side of the piston body 30; and the extension-side damping valve 51 on the one side of the piston body 30.

The piston unit 100 partitions the space inside the first cylinder 11 into a first oil chamber Y1 and a second oil chamber Y2. The first oil chamber Y1 is a space at the one side (lower side in FIG. 1) in the axial direction, and the second oil chamber Y2 is a space at the other side (upper side in FIG. 1) in the axial direction.

The bottom valve unit 60 is provided at the one side end of the hydraulic shock absorber 1 and provides partition between the reservoir chamber R and the first oil chamber Y1. The bottom valve unit 60 controls flow of oil between the reservoir chamber R and the first oil chamber Y1 along with movement of the piston unit 100.

[Operation of the Hydraulic Shock Absorber 1]

The above configured hydraulic shock absorber 1 of the present embodiment operates as follows.

For example, the piston rod 21 moves to the one side relative to the first cylinder 11.

This causes the piston unit 100 to move to the one side while compressing the oil in the first oil chamber Y1. The oil in the first oil chamber Y1 thus flows through the compression-side oil paths 311 (see FIG. 3) while opening the compression-side damping valve 41 and enters the second oil chamber Y2. The oil in the first oil chamber Y1 also flows through compression-side oil paths 61*d* (see FIG. 10) while opening a compression-side damping valve 68 and enters the reservoir chamber R.

Meanwhile, for example, the piston rod 21 moves to the other side relative to the first cylinder 11 (see FIG. 1). This causes the piston unit 100 to move to the other side while compressing the oil in the second oil chamber Y2. The oil in the second oil chamber Y2 thus flows through the extension-side oil paths 312 (see FIG. 3) while opening the extension-side damping valve 51 and enters the first oil chamber Y1. Also, the oil in the reservoir chamber R flows through extension-side oil paths 61*a* (see FIG. 10) while opening a check valve 64 and enters the first oil chamber Y1.

In this way, the hydraulic shock absorber 1 of the present embodiment generates a damping force along with movement of the piston unit 100.

Below a description will be given of the piston body 30.

[Configuration of the Piston Body 30]

As shown in FIG. 2A, the piston body 30 includes a through-hole 30H at the inside in the radial direction, the compression-side oil paths 311 on the outside in the radial direction of the through-hole 30H, and the extension-side oil paths 312 on the outside in the radial direction of the through-hole 30H. The piston body 30 further includes a first inner round part 32 at the other side and a first outer round part 33 at the other side. The piston body 30 further includes a first inclined part 34 at the other side and an outer edge 35 at the other side.

Also, as shown in FIG. 2B, the piston body 30 includes a second inner round part 36 at the one side, a second outer round part 37 at the one side, and an annular protrusion 38 (an example of the first protrusion and the protrusion) at the one side.

For example, the piston body 30 of the present embodiment is formed of a sintered body of metal powder filled in a mold of a predetermined shape.

As shown in FIG. 3, the through-hole 30H is formed in the axial direction of the piston body 30. The piston rod 21 is inserted into the through-hole 30H. The piston body 30 is thus attached to a distal end of the piston rod 21 at the one side.

The compression-side oil paths 311 permit flow of oil between the first oil chamber Y1 and the second oil chamber Y2 during a compression stroke of the hydraulic shock absorber 1. As shown in FIG. 2A, the multiple (four in the present embodiment) compression-side oil paths 311 are arranged at substantially equal intervals in the circumferential direction.

The extension-side oil paths 312 permit flow of oil between the second oil chamber Y2 and the first oil chamber Y1 during an extension stroke of the hydraulic shock absorber 1. As shown in FIG. 2A, the multiple (four in the present embodiment) extension-side oil paths 312 are arranged at substantially equal intervals in the circumferential direction.

As shown in FIG. 2A, the first inner round part 32 is formed substantially in a circular shape and provided around the outer periphery of the through-hole 30H. As shown in FIG. 3, the first inner round part 32 protrudes from a first end face 30A, which is formed at the other side, axially further to the other side. In the present embodiment, the first inner round part 32 contacts a radially inward portion of the compression-side damping valve 41.

As shown in FIG. 2A, the first outer round part 33 is formed substantially in a circular shape and on the outside in the radial direction of the compression-side oil paths 311. As shown in FIG. 3, the first outer round part 33 protrudes from the first end face 30A axially further to the other side. The protrusion height of the first outer round part 33 is slightly larger than that of the first inner round part 32.

As shown in FIG. 3, the first outer round part 33 is formed along a plane substantially perpendicular to the axial direction of the piston body 30. The first outer round part 33 is the most protruding part of the piston body 30 at the other side thereof. The first outer round part 33 forms a part where the piston body 30 contacts a radially outward portion of the compression-side damping valve 41.

As shown in FIG. 3, the first inclined part 34 is a surface inclined relative to the axial direction of the piston body 30. The first inclined part 34 is continuous from the first outer round part 33 and the outer edge 35.

The outer edge 35 is on the outside of the first inclined part 34 in the radial direction. The outer edge 35 has a plane substantially perpendicular to the axial direction of the piston body 30.

As shown in FIG. 2B, the second inner round part 36 is formed substantially in a circular shape and around the outer periphery of the through-hole 30H. As shown in FIG. 3, the second inner round part 36 protrudes from a second end face 30B, which is formed at the one side, axially further to the one side. In the present embodiment, the second inner round part 36 contacts a radially inward portion of the extension-side damping valve 51.

As shown in FIG. 2B, the second outer round part 37 is formed substantially in a circular shape. The second outer round part 37 is formed at the one side and radially outside of the extension-side oil paths 312 and radially inside of the compression-side oil paths 311. As shown in FIG. 3, the second outer round part 37 protrudes from the second end face 30B axially further to the one side. The protrusion height of the second outer round part 37 is slightly larger than that of the second inner round part 36. In the present embodiment, the second outer round part 37 protrudes toward the extension-side damping valve 51. The second outer round part 37 forms a part where the piston body 30 contacts a radially outward portion of the extension-side damping valve 51.

The annular protrusion 38 is a cylindrical portion (see FIGS. 2B and 3). Here, the term "cylindrical" means not only a strict cylindrical shape but also a shape formed with radial or axial protrusions and recesses. That is, the term "cylindrical" as referred to in the present embodiment means a substantially cylindrical shape. As shown in FIG. 3, the annular protrusion 38 is at the outside of the piston body 30 in radial direction. The annular protrusion 38 axially protrudes to the one side further than the second outer round part 37.

The annular protrusion 38 includes an inner periphery 381 at the inside in the radial direction and an edge 382 at the one side.

The edge 382 is formed along a plane perpendicular to the axial direction. The edge 382 is continuous to the inner periphery 381 at the inside in the radial direction.

[Configuration of the Compression-Side Damping Valve 41 and the Extension-Side Damping Valve 51]

Below a description will be given of the configuration of the compression-side damping valve 41 and the extension-side damping valve 51.

As shown in FIG. 3, the compression-side damping valve 41 consists of multiple disk-like plates made of a metal material, for example. The compression-side damping valve 41 includes at the inside in the radial direction an opening 41H allowing for passage of the piston rod 21. Thus, the compression-side damping valve 41 can also be said to consist of multiple annular plates. The compression-side damping valve 41 is formed larger than the outer diameter of the first outer round part 33. The compression-side damping valve 41 covers the other side of the compression-side oil paths 311 and leaves the other side of the extension-side oil paths 312 always open.

The extension-side damping valve 51 consists of multiple disk-like plates made of a metal material, for example. The extension-side damping valve 51 includes at the inside in the radial direction an opening 51H allowing for passage of the piston rod 21. Thus, the extension-side damping valve 51 can also be said to consist of multiple annular plates. The extension-side damping valve 51 is formed larger than the outer diameter of the second outer round part 37. The extension-side damping valve 51 covers the one side of the extension-side oil paths 312 and leaves the one side of the compression-side oil paths 311 always open.

As shown in FIG. 3, the piston body 30, the compression-side damping valve 41, and the extension-side damping valve 51 are attached to the piston rod 21 via a valve stopper 22 with a nut 23.

Figure 6:
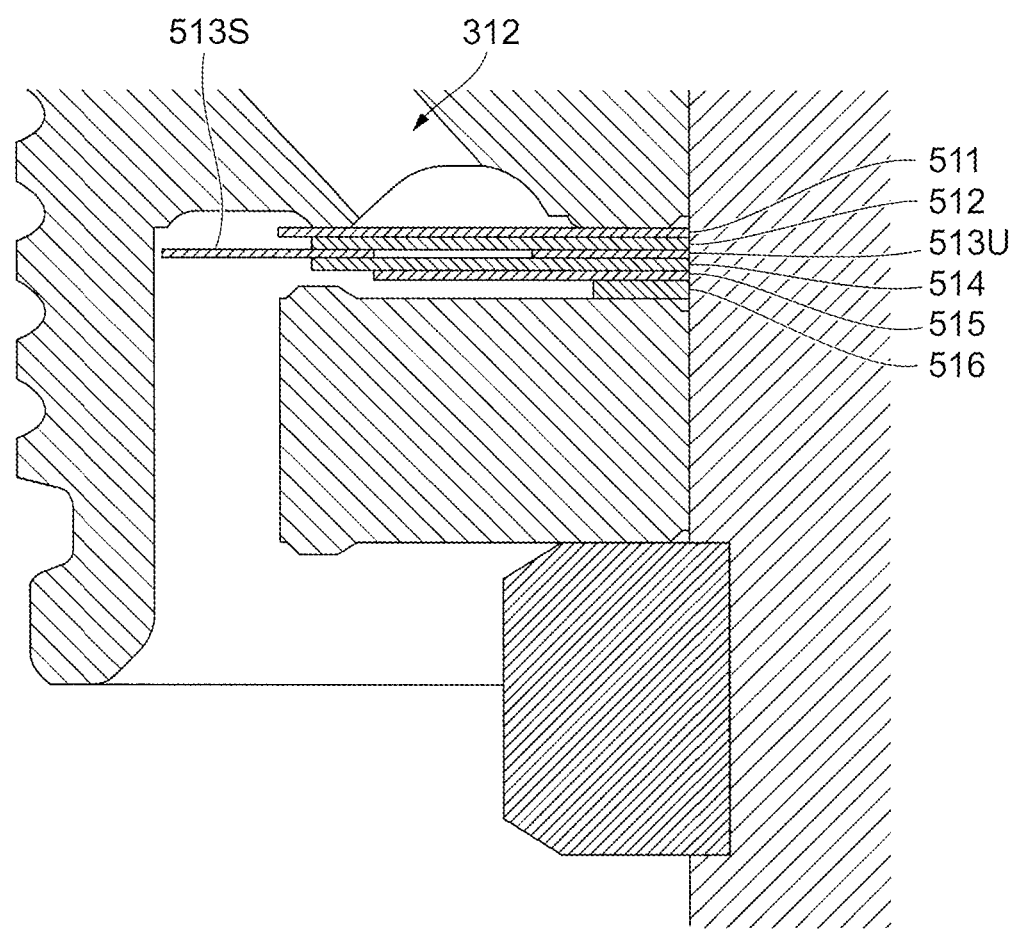
FIG. 6 is an enlarged view of the extension-side damping valve.

FIG. 6 is an enlarged view of the extension-side damping valve 51.

Below a description will be given of the configuration of the extension-side damping valve 51 mainly with reference to the FIGS. 4 to 6.

As shown in FIGS. 4 and 6, the extension-side damping valve 51 has a six-layer structure composed of seven disk-like plates. Specifically, the extension-side damping valve 51 includes: a first-layer valve plate 511 (an example of the opening and closing member) located closest to the other side i.e., closest to the piston body 30; a second-layer reinforcing plate 512; a third-layer preload plate 513S (an example of the preload member) on the outer periphery side; a third-layer level-difference adjusting plate 513U (an example of the level-difference adjusting member) on the inner periphery side; a fourth-layer first pressing plate 514 (an example of the first pressing member); a fifth-layer reinforcing plate 515; and a sixth-layer second pressing plate 516 (an example of the second pressing member) located closest to the one side i.e., farthest from the piston body 30.

The first-layer valve plate 511 covers and closes the extension-side oil paths 312, and opens the extension-side oil paths 312 by deforming under pressure of oil. That is, when the pressure of oil from the extension-side oil paths 312 is negative or zero or when that pressure is positive but weak, the valve plate 511 closes the extension-side oil paths 312 to prevent flow of oil from the extension-side oil paths 312. On the other hand, when the pressure of oil from the extension-side oil paths 312 exceeds a predetermined pressure, the valve plate 511 deforms such that its outer periphery turns over toward the one side. This produces a gap for flow of oil, opening the valve. As a result, the oil can flow out of the extension-side oil paths 312 through this gap.

The second-layer reinforcing plate 512 reinforces the valve plate 511 and provides rigidity to the valve plate 511. Providing the reinforcing plate 512 can prevent excessive displacement or deformation of the valve plate 511, without increasing rigidity of the valve plate 511 itself. Note that the reinforcing plate 512 is not essential when sufficient rigidity can be ensured with the valve plate 511 alone.

The third-layer preload plate 513S is a member to apply preload to the valve plate 511. The "preload" as referred to herein means a force applied in advance. That is, by the effect of the preload plate 513S, the valve plate 511 is applied with a pressing force toward the piston body 30 in advance. This increases the pressure of oil when the valve plate 511 deforms. The pressure of oil for opening the extension-side oil paths 312 is thus regulated.

As shown in FIG. 5, the preload plate 513S includes the ring-shaped portion 513a formed in a ring shape and the axis alignment portions 513b protruding radially outward from the outer periphery 513c of the ring-shaped portion 513a and performing axis alignment. In FIG. 5, the boundary between the ring-shaped portion 513a and each axis alignment portion 513b is shown by the dotted line T1 on the preload plate 513S. More specifically, the axis alignment portions 513b of the preload plate 513S protrude from the outer periphery of the ring-shaped portion 513a toward a radially inward portion of the annular protrusion 38. The axis alignment portions 513b thus contact the radially inward portion of the annular protrusion 38, whereby axis alignment is made.

The preload plate 513S is a member positioned between the valve plate 511 and the first pressing plate 514 for creating a level difference. The level difference is created by the ring-shaped portion 513a. The ring-shaped portion 513a is positioned at a position corresponding to the outer periphery side of the valve plate 511. This can more effectively apply the preload to the valve plate 511. That is, as the outer periphery side of the valve plate 511 turns over to open the valve as described above, applying the force to this outer periphery side can prevent deformation of the valve plate 511. Note that the position where the valve plate 511 turns over coincides with an outlet of oil from the extension-side oil paths 312. Accordingly, the ring-shaped portion 513a can also be said to be located at the position axially corresponding to this outlet.

In the present embodiment, preferably, the ring-shaped portion 513a has a shape other than a circular ring shape. The term "circular ring" as referred to herein means a shape consisting of two concentric circles having different radii, with the larger radius one defining an outer periphery and the smaller radius one defining an inner periphery.

As an example of the shape other than the circular shape, the ring-shaped portion 513a may have a non-uniform radial width. In other words, the radial width of the ring-shaped portion 513a may be varied in the circumferential direction.

The results in the preload varying in the circumferential direction. Specifically, at a portion where the radial width of the ring-shaped portion 513a is small, the preload reduces. On the other hand, at a portion where the radial width of the ring-shaped portion 513a is large, the preload increases. That is, the pressure of oil applied at the onset of deformation of the valve plate 511 varies in the circumferential direction. As a result, the valve plate 511 starts to open from its portion under small preload and then, with increase in pressure of oil, opens sequentially from its portions under smaller preloads to those under greater preloads. This means that the valve plate 511 gradually opens. If, unlike this embodiment, the ring-shaped portion 513a has a uniform radial width, the valve plate 511 tends to suddenly deform and open upon the oil reaching a predetermined pressure. The present embodiment can prevent this phenomenon.

To make the radial width of the ring-shaped portion 513a non-uniform, for example, the present embodiment gives the outer periphery 513c (an example of the outer periphery) a round shape and gives the inner periphery 513d (an example of the inner periphery) a shape other than a round shape, as depicted by the ring-shaped portion 513a of the preload plate 513S shown in FIG. 5. That is, the outer periphery 513c is a portion where a strong preload is applied when a level difference is created by the preload plate 513S. Hence, the radial position of the outer periphery 513c is preferably constant. In other words, the outer periphery 513c is preferably given a round shape. In FIG. 5, the circle center of the outer periphery 513c is depicted by the point O, and its radius is depicted by the dotted arrow T2. On the other hand, the inner periphery 513d is a portion where a weaker preload is applied than the outer periphery 513c, and thus changing its shape has little effect. Thus, the inner periphery 513d is given a shape other than a round shape to thereby make the radial width of the ring-shaped portion 513a non-uniform.

In an example shown in FIG. 5, the inner periphery 513d has an elliptical shape. The minor axis of the ellipse coincides with the vertical direction of the figure, and the major axis of the ellipse coincides with the horizontal direction of the figure. Accordingly, a maximum width portion 513e of the ring-shaped portion 513a, where its radial width becomes the largest width W1, coincides with the minor axis of the ellipse of the ring-shaped portion 513a. A minimum width portion 513f of the ring-shaped portion 513a, where its radial width becomes the smallest width W2, coincides with the major axis of the ellipse of the ring-shaped portion 513a.

In the example shown in FIG. 5, four axis alignment portions 513b are arranged in the circumferential direction at every 90 degrees. Radial distal ends of the respective axis alignment portions 513b contact the inner periphery 381 of the annular protrusion 38 at the inside in the radial direction thereof, whereby axis alignment (centering) of the preload plate 513S is made. In FIG. 5, the position of the inner periphery 381 relative to the axis alignment portions 513b is depicted by the round dotted line T3 connecting the radial distal ends of the respective axis alignment portions 513b.

The level-difference adjusting plate 513U is disposed on the third layer similarly to the preload plate 513S and inside of the preload plate 513S in the radial direction. The level-difference adjusting plate 513U is a member to adjust the level difference created by the preload plate 513S. In FIG. 5, the position of the level-difference adjusting plate 513U relative to the preload plate 513S is depicted by the dotted lines.

The thickness of the level-difference adjusting plate 513U is smaller than that of the preload plate 513S. Accordingly, the one-side face of the preload plate 513S and the one-side face of the level-difference adjusting plate 513U lie flush with each other. On the other hand, the other-side face of the preload plate 513S and the other-side face of the level-difference adjusting plate 513U do not lie flush with each other. This creates a gap between the level-difference adjusting plate 513U and the reinforcing plate 512 in the axial direction, and this gap creates the level difference. Thus, adjusting the thickness of the level-difference adjusting plate 513U can adjust the level difference created by the preload plate 513S. Providing the level-difference adjusting plate 513U can limit the bending of the valve plate 511 when it opens. This is advantageous in that the inner periphery side of the valve plate 511 hardly buckles. The inner periphery 513d of the preload plate 513S and an outer periphery 513U1 of the level-difference adjusting plate 513U are spaced from each other as shown in FIG. 6, forming a gap in the radial direction. This prevents the level-difference adjusting plate 513U from obstructing application of the preload. Also, the radial length of this gap may be changed by changing the size of the outer periphery 513U1 of the level-difference adjusting plate 513U, whereby the size of the preload may be changed. Note that the level-difference adjusting plate 513U is not necessary when there is no need to adjust the level difference created by the preload plate 513S.

The first pressing plate 514 presses the preload plate 513S against the valve plate 511. By being pressed by the first pressing plate 514 from the one side to the other side, the preload plate 513S can apply the preload to the valve plate 511.

Similarly to the reinforcing plate 512, the reinforcing plate 515 reinforces the valve plate 511 and provides rigidity to the valve plate 511.

The second pressing plate 516 presses radially inward portions of the valve plate 511, the reinforcing plate 512, the level-difference adjusting plate 513U, the first pressing plate 514, and the reinforcing plate 515 against the channel forming part. Specifically, the radial outer periphery of the second pressing plate 516 is made smaller than that of the other plates, which allows the second pressing plate 516 to selectively press the inner peripheries of the plates on the other side of the second pressing plate 516. Thus, the plates on the other side of the second pressing plate 516 are fixed at their inner peripheries by the second pressing plate 516 while their outer peripheries remain unfixed. This permits unobstructed deformation of the valve plate 511.

Each of the valve plate 511, the reinforcing plate 512, the level-difference adjusting plate 513U, the first pressing plate 514, the reinforcing plate 515, and the second pressing plate 516 is formed in a ring shape as described above, and the axis alignment is made at the inner periphery of the ring shape. In this case, the inner periphery of the ring shape defines the opening 51H.

[Modifications of the Preload Plate 513S]

The way of making the radial width of the ring-shaped portion 513a of the preload plate 513S non-uniform is not limited to that shown in FIG. 5.

FIGS. 7A to 7C show modifications of the preload plate 513S.

The ring-shaped portion 513a of the preload plate 513S shown in FIG. 7A includes the outer periphery 513c and the inner periphery 513d both of which are in a round shape. The circle center point O2 of the inner periphery 513d is shifted from the circle center point O1 of the outer periphery 513c, whereby the radial width of the ring-shaped portion 513a is made non-uniform. In the shown example, the circle center point O2 of the inner periphery 513d is shifted from the circle center point O1 of the outer periphery 513c upward in the figure. In the figure, the radius of the circle defined by the outer periphery 513c is depicted by the dotted arrow T21, and the radius of the circle defined by the inner periphery 513d is depicted by the dotted arrow T22. From the above, a maximum width portion 513e, where the ring-shaped portion 513a has the largest radial width W1, resides on the lower side of the figure. A minimum width portion 513f, where the ring-shaped portion 513a has the smallest radial width W2, resides on the upper side of the figure. The axis alignment portions 513b are the same as those in FIG. 5.

The ring-shaped portion 513a of the preload plate 513S shown in FIG. 7B includes the inner periphery 513d that has a wave shape in the circumferential direction. With this wave shape, the radial width of the ring-shaped portion 513a is made non-uniform. The wave pattern of the inner periphery 513d repeats itself every 90 degrees in the circumferential direction. Accordingly, in FIG. 7B, maximum width portions 513e, where the ring-shaped portion 513a has the largest radial width W1, are present at every 90 degrees in the circumferential direction, namely at four positions in the figure. Also, minimum width portions 513f, where the ring-shaped portion 513a has the smallest radial width W2, are present at every 90 degrees in the circumferential direction, namely at four positions in the figure. The maximum width portions 513e and the minimum width portions 513f are shifted from each other in the circumferential direction by 45 degrees. The axis alignment portions 513b are the same as those in FIG. 5.

The ring-shaped portion 513a of the preload plate 513S shown in FIG. 7C includes the inner periphery 513d that has a wave shape in the circumferential direction, similarly to FIG. 7B. With this wave shape, the radial width of the ring-shaped portion 513a is made non-uniform. The wave pattern of the inner periphery 513d repeats itself every 120 degrees in the circumferential direction. Accordingly, in FIG. 7C, maximum width portions 513e, where the ring-shaped portion 513a has the largest radial width W1, are present at every 120 degrees in the circumferential direction, namely at three positions in the figure. Also, minimum width portions 513f, where the ring-shaped portion 513a has the smallest radial width W2, are present at every 120 degrees in the circumferential direction, namely at three positions in the figure. The maximum width portions 513e and the minimum width portions 513f are shifted from each other in the circumferential direction by 60 degrees. Three axis alignment portions 513b are arranged in the circumferential direction at 120 degrees intervals.

The number of axis alignment portions 513b is not particularly limited as long as three or more are provided to enable axis alignment.

Preferably, the ring-shaped portion 513a is shaped such that its radial width is varied according to the positions of the axis alignment portions 513b.

For example, in FIG. 5, the maximum width portions 513e coincide with the positions of the two axis alignment portions 513b on the upper and lower sides of the figure, and the minimum width portions 513f coincide with the positions of the two axis alignment portions 513b on the left and right sides of the figure. In this manner, the radial width of the ring-shaped portion 513a is varied according to the positions of the axis alignment portions 513b.

In FIG. 7A, the minimum width portion 513f coincides with the position of the axis alignment portion 513b on the upper side of the figure, and the maximum width portion 513e coincides with the position of the axis alignment portion 513b on the lower side of the figure. In this manner, the radial width of the ring-shaped portion 513a is varied according to the positions of the axis alignment portions 513b.

In FIG. 7B, the minimum width portions 513f coincide with the positions of the four axis alignment portions 513b on the upper, lower, left and right sides of the figure, and the maximum width portions 513e coincide with the positions between each two adjacent axis alignment portions 513b in the circumferential direction. In this manner, the radial width of the ring-shaped portion 513a is varied according to the positions of the axis alignment portions 513b.

In FIG. 7C, the maximum width portions 513e coincide with the positions of the three axis alignment portions 513b, and the minimum width portions 513f coincide with the positions between each two adjacent axis alignment portions 513b in the circumferential direction. In this manner, the radial width of the ring-shaped portion 513a is varied according to the positions of the axis alignment portions 513b.

As another example of giving the ring-shaped portion 513a a shape other than a circular ring shape, the outer periphery 513c and the inner periphery 513d may be given a shape other than a round shape such that the radial width of the ring-shaped portion 513a becomes uniform. In this case, the radial width of the ring-shaped portion 513a does not vary in the circumferential direction.

Figure 8C:
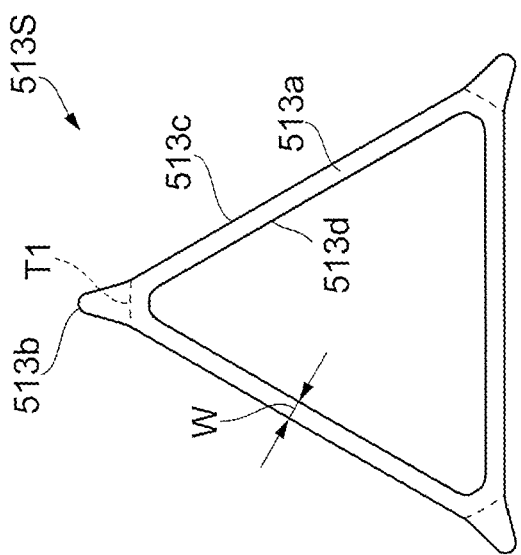
FIGS. 8A to 8C show other modifications of the preload plate.
Figure 8B:
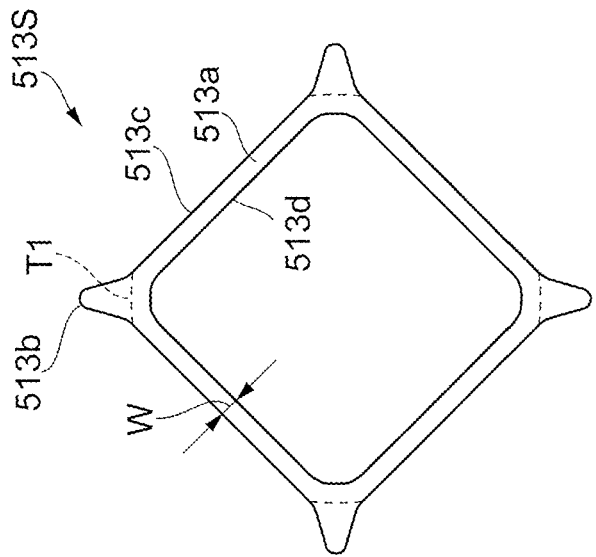
Figure 8A:
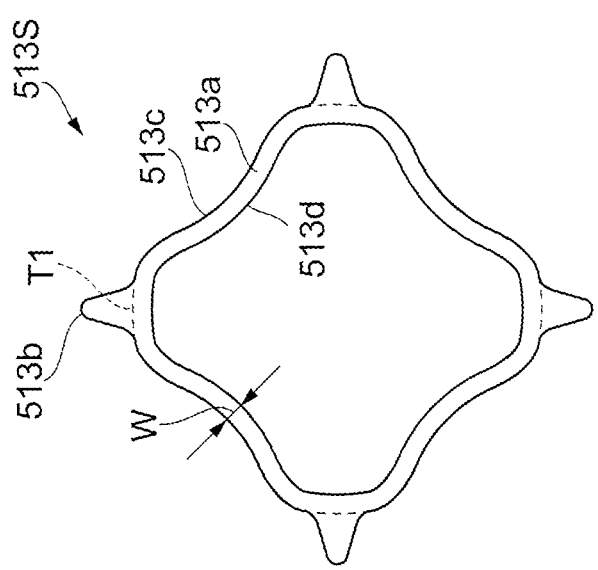

FIGS. 8A to 8C show other modifications of the preload plate 513S.

The ring-shaped portion 513a of the preload plate 513S shown in FIG. 8A includes the outer periphery 513c and the inner periphery 513d both of which are in a wave shape, so that the radial width of the ring-shaped portion 513a is uniform. This means that the radial width of the ring-shaped portion 513a is constant at the width W in the circumferential direction. Four axis alignment portions 513b are arranged in the circumferential direction at 90 degrees intervals, similarly to FIG. 5.

The ring-shaped portion 513a of the preload plate 513S shown in FIG. 8B includes the outer periphery 513c and the inner periphery 513d both of which are substantially square, so that the radial width of the ring-shaped portion 513a is uniform. In this case too, the radial width of the ring-shaped portion 513a is constant at the width W in the circumferential direction. The axis alignment portions 513b are arranged at respective vertices of the substantial square defined by the outer periphery 513c. This means that four axis alignment portions 513b are arranged in the circumferential direction at 90 degrees intervals, similarly to FIG. 5.

The ring-shaped portion 513a of the preload plate 513S shown in FIG. 8C includes the outer periphery 513c and the inner periphery 513d both of which are substantially triangle, so that the radial width of the ring-shaped portion 513a is uniform. In this case too, the radial width of the ring-shaped portion 513a is constant at the width W in the circumferential direction. The axis alignment portions 513b are arranged at respective vertices of the substantial triangle defined by the outer periphery 513c. This means that three axis alignment portions 513b are arranged in the circumferential direction at 120 degrees intervals, similarly to FIG. 7C.

Alternatively, the preload may be varied in the circumferential by varying sizes and/or shapes of the axis alignment portions 513b.

Figure 9:
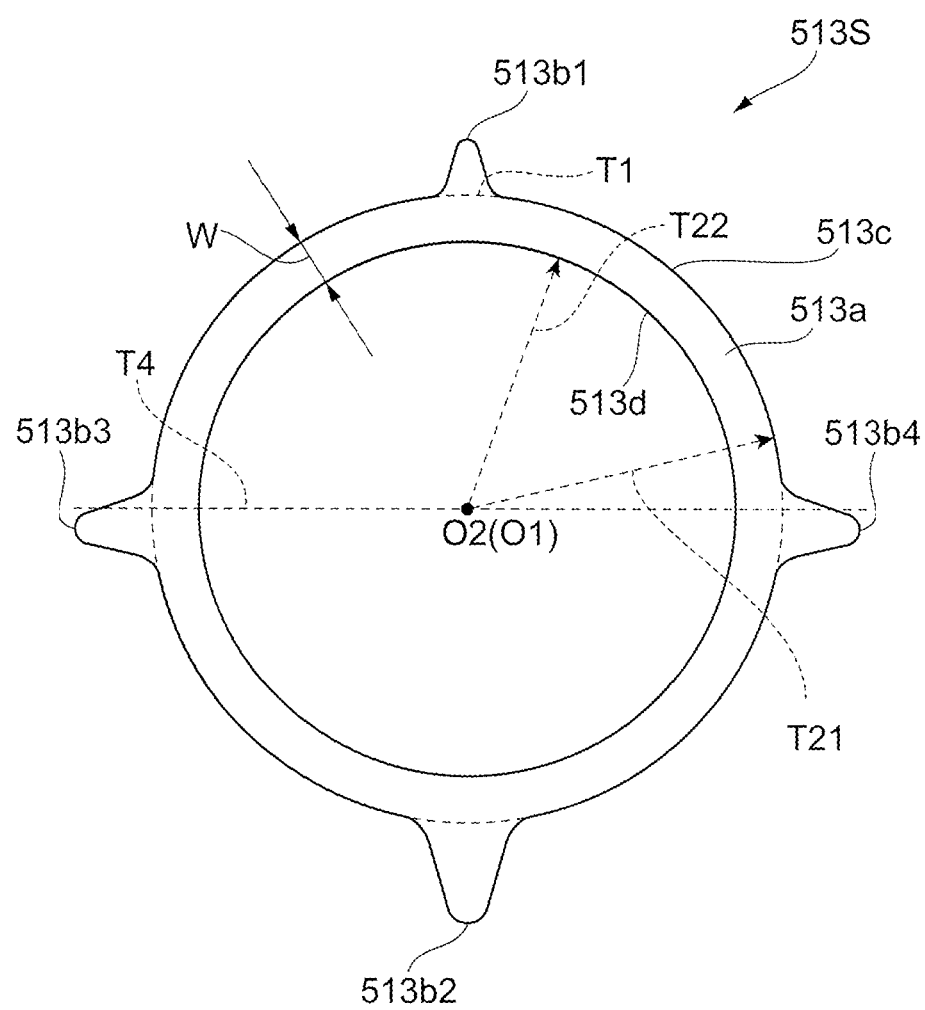
FIG. 9 shows still another modification of the preload plate.

FIG. 9 shows still another modification of the preload plate 513S.

Compared to the preload plate 513S shown in FIG. 7A, the preload plate 513S shown in FIG. 9 has the circle center point O1 of the outer periphery 513c coinciding with the circle center point O2 of the inner periphery 513d. This gives the ring-shaped portion 513a a circular ring shape. In the figure, the radius of the circle defined by the outer periphery 513c is depicted by the dotted arrow T21, and the radius of the circle defined by the inner periphery 513d is depicted by the dotted arrow T22. Since the circle defined by the outer periphery 513c and the circle defined by the inner periphery 513d are concentric in this case, the radial width of the ring-shaped portion 513a becomes uniform. Accordingly, the radial width of the ring-shaped portion 513a is constant at the width W in the circumferential direction.

Similarly to FIG. 7A, four axis alignment portions 513b are arranged in the circumferential direction at 90 degrees intervals. However, the axis alignment portions 513b of FIG. 9 have different sizes and shapes from those of FIG. 7A. Specifically, as the ring-shaped portion 513A of FIG. 9 is shifted upward in the figure relative to the axis alignment portions 513b, the axis alignment portion 513b1 positioned on the upper side of FIG. 9 becomes small as compared to the corresponding axis alignment portion 513b of FIG. 7A. Also, the axis alignment portion 513b2 positioned on the lower side of FIG. 9 becomes large as compared to the corresponding axis alignment portion 513b of FIG. 7A. The axis alignment portion 513b3 and the axis alignment portion 513b4 on the left and the right sides, respectively, of FIG. 9 have the same size, but they are at positions shifted downward from the position of the point O2 (O1). In other words, the axis alignment portion 513b3 and the axis alignment portion 513b4 are at positions shifted downward from the dotted line T4. Thus, the axis alignment portion 513b1, the axis alignment portion 513b2, and the axis alignment portions 513b3 and 513b4 have different sizes or shapes from each other.

In the examples shown in FIGS. 8A to 8C and 9 too, the preload varies in the circumferential direction. Thus, the pressure of oil applied at the onset of deformation of the valve plate 511 varies in the circumferential direction. As a result, this can prevent sudden deformation and opening of the valve plate 511.

The way of giving the ring-shaped portion 513a a shape other than a circular ring shape may combine that shown in FIGS. 5 and 7A to 7C, whereby the radial width of the ring-shaped portion 513a is made uneven, and that shown in FIG. 8, whereby the outer periphery 513c and the inner periphery 513d of the ring-shaped portion 513a are given a shape other than a round shape. The way shown in FIG. 9, whereby the size or the shape of the axis alignment portions 513b are varied, may also be combined.

From the above, it will be understood that the "ring-shape" of the ring-shaped portion 513a does not solely mean a circular ring shape. As described above, the circular ring shape herein means concentric circles consisting of the outer periphery 513c of a larger circle and the inner periphery 513d of a smaller circle. However, as shown in FIGS. 7A to 7C, the "ring-shape" as referred to in the present embodiment encompasses the outer periphery 513c and the inner periphery 513d that are not in a round shape, and also they do not need to be concentric. Also, the ring-shaped portion 513a may have radial or axial protrusions and recesses. As explained in FIG. 8A to 8C, the ring may be formed by a wave shape or a polygon such as square and triangle. That is, the "ring-shape" as referred to in the present embodiment means a substantial ring shape and encompasses any ring in a broad sense.

[Configuration of the Bottom Valve Unit 60]

Now a description will be given of the bottom valve unit 60.

Figure 10:
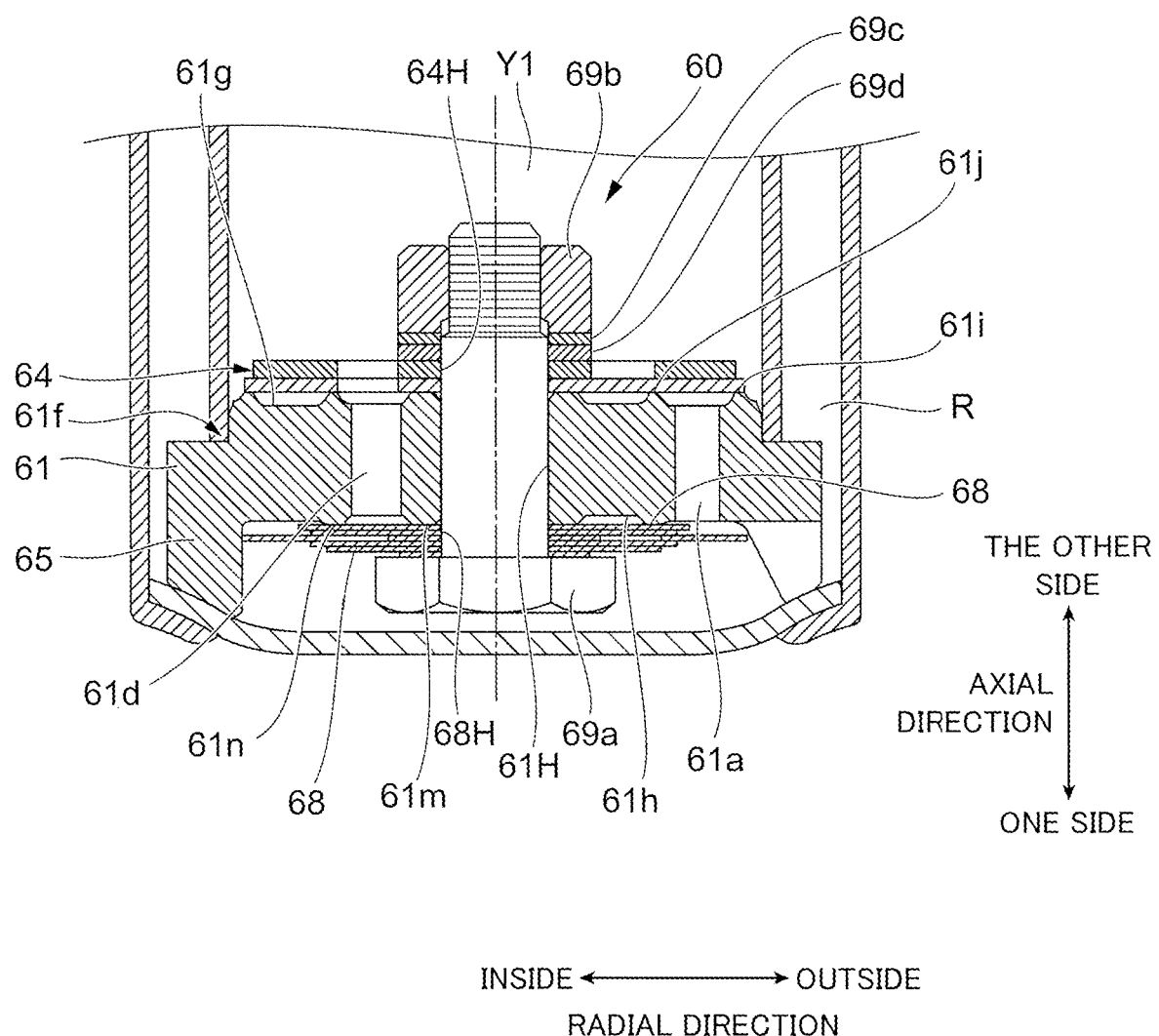
FIG. 10 is a sectional view of a bottom valve unit of the present embodiment.

FIG. 10 is a sectional view of the bottom valve unit 60 of the present embodiment.

Figure 11:
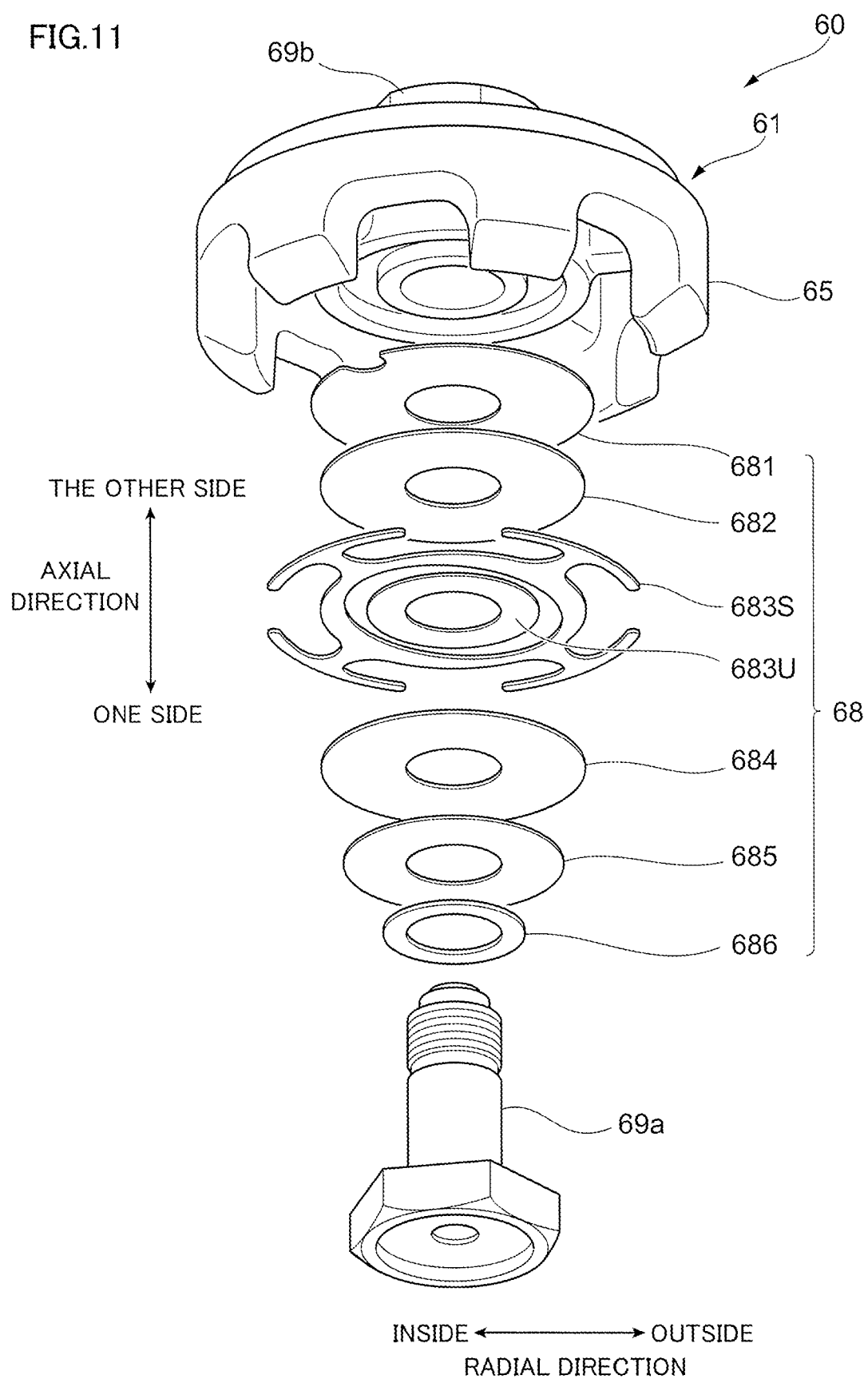
FIG. 11 is an exploded perspective sectional view of a compression-side damping valve.

FIG. 11 is an exploded perspective sectional view of the compression-side damping valve 68.

Figure 12:
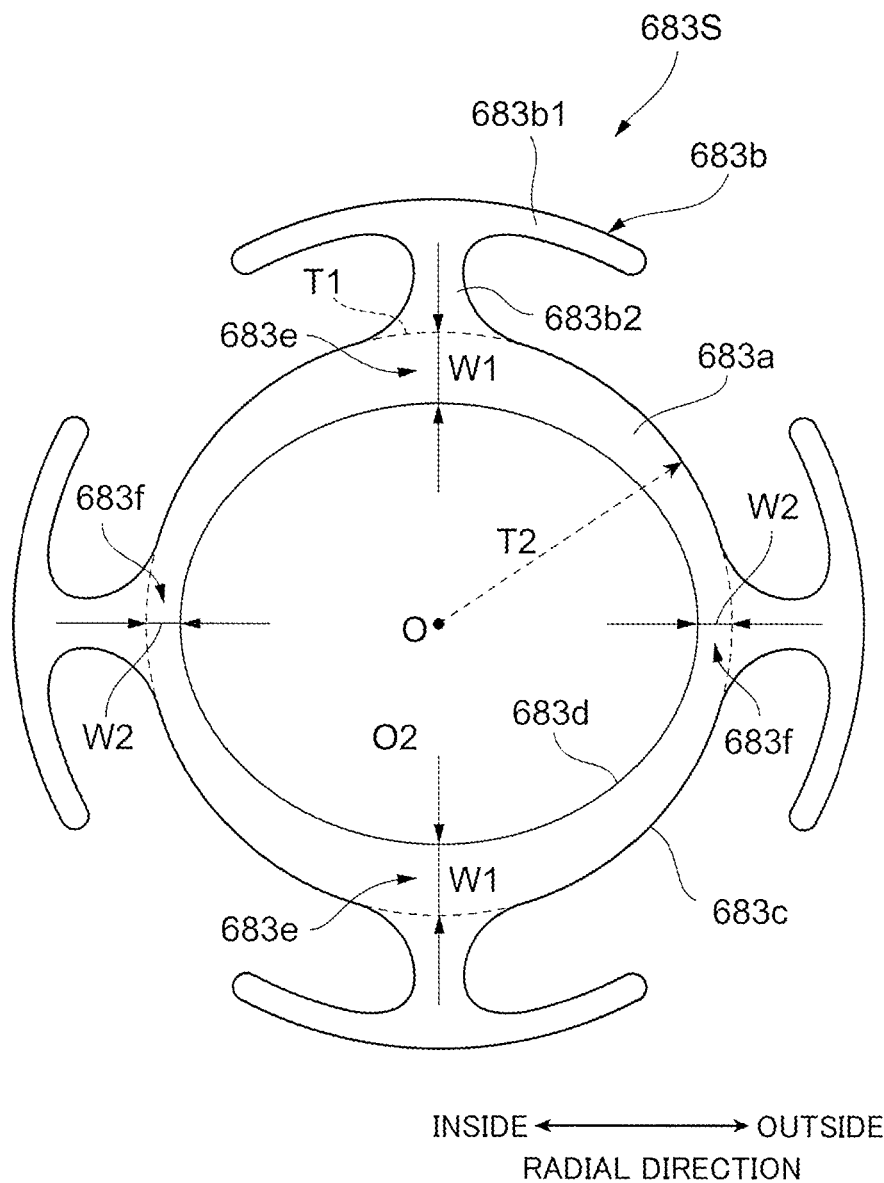
FIG. 12 shows the preload plate.

FIG. 12 shows the preload plate 683S.

The bottom valve unit 60 includes a bottom piece 61 (an example of the channel forming part and the bottom piece) formed with multiple oil paths (described later) penetrating in the axial direction; the check valve 64 on the other side of the bottom piece 61; and the compression-side damping valve 68 (an example of the opening and closing part) on the one side of the bottom piece 61.

[Configuration of the Bottom Piece 61]

As shown in FIG. 10, the bottom piece 61 includes a through-hole 61H on the inside in the radial direction; compression-side oil paths 61d (an example of the channel) on the outside of the through-hole 61H in the radial direction; and extension-side oil paths 61a on the outside of the through-hole 61H in the radial direction. The bottom piece 61 further includes a first inner round part 61j on the other side and a first outer round part 61i on the other side. The bottom piece 61 further includes a step 61f on the other side.

As shown in FIG. 10, the bottom piece 61 further includes a second inner round part 61m on the one side, a second outer round part 61n on the one side, and lugs 65 (an example of the second protrusion and the protrusion) on the one side.

For example, the bottom piece 61 of the present embodiment is formed of a sintered body of metal powder filled in a mold of a predetermined shape.

As shown in FIG. 10, the through-hole 61H is formed in the axial direction of the bottom piece 61. A bolt 69a penetrates the through-hole 61H from the one side to the other side. The check valve 64 and the compression-side damping valve 68 are attached to the bottom piece 61 by being fastened with the bolt 69a and a nut 69b via two washers 69c, 69d.

The compression-side oil paths 61d permit flow of oil between the first oil chamber Y1 and the reservoir chamber R during a compression stroke of the hydraulic shock absorber 1. Multiple (four in the present embodiment) compression-side oil paths 61d are arranged in the circumferential direction at substantially equal intervals.

The extension-side oil paths 61a permit flow of oil between the reservoir chamber R and the first oil chamber Y1 during an extension stroke of the hydraulic shock absorber 1. Multiple (four in the present embodiment) extension-side oil paths 61a are arranged in the circumferential direction at substantially equal intervals.

The first inner round part 61j is formed substantially in a circular shape and provided around the outer periphery of the through-hole 61H. As shown in FIG. 10, the first inner round part 61j protrudes from a first end face 61g, which is formed at the other side, axially further to the other side. In the present embodiment, the first inner round part 61j contacts a radially inward portion of the check valve 64.

The first outer round part 61i is formed substantially in a circular shape and on the outside of the extension-side oil paths 61a in the radial direction. As shown in FIG. 10, the first outer round part 61i protrudes from the first end face 61g axially further to the other side. The first outer round part 61i contacts a radially outward portion the check valve 64.

The step 61f is formed substantially in a circular shape and around the outer periphery of the first outer round part 61i. As shown in FIG. 10, the step 61f is used for insertion of the one side end of the first cylinder 11 onto the bottom piece 61 and sealing of the first cylinder 11. To put it other way, the bottom piece 61 is provided on the opposite side of the first cylinder 11 to its side receiving the piston rod 21 and seals the first cylinder 11.

The second inner round part 61m is formed substantially in a circular shape and around the outer periphery of the through-hole 61H. As shown in FIG. 10, the second inner round part 61m protrudes from a second end face 61h, which is formed at the one side, axially further to the one side. In the present embodiment, the second inner round part 61m contacts a radially inward portion of the compression-side damping valve 68.

The second outer round part 61n is formed substantially in a circular shape. The second outer round part 61n is formed at the one side and radially outside of the compression-side oil paths 61d and radially inside of the extension-side oil paths 61a. As shown in FIG. 10, the second outer round part 61n protrudes from the second end face 61h axially further to the one side. The second outer round part 61n forms a part where the bottom piece 61 contacts a radially outward portion of the compression-side damping valve 68.

As shown in FIG. 11, the lugs 65 protrude axially to the one side and are arranged in the circumferential direction. In the present embodiment, six lugs 65 are formed in the circumferential direction. The lugs 65 contact the bottom of the hydraulic shock absorber 1 and let oil flow between the lugs 65. Thus, the bottom piece 61 does not obstruct flow of oil between the first oil chamber Y1 and the reservoir chamber R.

[Configuration of the Check Valve 64 and the Compression-Side Damping Valve 68]

As shown in FIG. 10, the check valve 64 consists of multiple disk-like plates made of a metal material, for example. The check valve 64 includes at the inside in the radial direction an opening 64H for passage of the bolt 69a. Thus, the check valve 64 can also be said to consist of multiple annular plates. The check valve 64 is formed larger than the outer diameter of the first outer round part 61i. The check valve 64 covers the other side of the extension-side oil paths 61a and leaves the other side of the compression-side oil paths 61d always open.

The compression-side damping valve 68 consists of multiple disk-like plates made of a metal material, for example. The compression-side damping valve 68 includes at the inside in the radial direction an opening 68H allowing for passage of the bolt 69a. Thus, the compression-side damping valve 68 can also be said to consist of multiple annular plates. The compression-side damping valve 68 is formed larger than the outer diameter of the second outer round part 61n. The compression-side damping valve 68 covers the one side of the compression-side oil paths 61d and leaves the one side of the extension-side oil paths 61a always open.

Now a description will be given of the configuration of the compression-side damping valve 68 with reference to FIGS. 11 and 12.

The configuration of the compression-side damping valve 68 is almost the same as that of the extension-side damping valve 51 described above. That is, the compression-side damping valve 68 has a six-layer structure composed of seven disk-like plates, as shown in FIGS. 11 and 12. The compression-side damping valve 68 includes: a first-layer valve plate 681 (an example of the opening and closing member) located closest to the other side i.e., closest to the bottom piece 61; a second-layer reinforcing plate 682; a third-layer preload plate 683S (an example of the preload member) on the outer periphery side; a third-layer level-difference adjusting plate 683U (an example of the level-difference adjusting member) on the inner periphery side; a fourth-layer first pressing plate 684 (an example of the first pressing member); a fifth-layer reinforcing plate 685; and a sixth-layer second pressing plate 686 (an example of the second pressing member) located closest to the one side i.e., farthest from the bottom piece 61.

The functions of these disk-like plates are the same as those of the extension-side damping valve 51 described above. Specifically, the valve plate 681 and the reinforcing plate 682 have the same functions as the valve plate 511 and the reinforcing plate 512, respectively. The preload plate 683S and the level-difference adjusting plate 683U have the same functions as the preload plate 513S and the level-difference adjusting plate 513U, respectively. The first pressing plate 684, the reinforcing plate 685, and the second pressing plate 686 have the same functions as the first pressing plate 514, the reinforcing plate 515, and the second pressing plate 516, respectively.

The shape of the preload plate 683S shown in FIG. 12 is different from that of the preload plate 513S shown in FIG. 5.

Similarly to the preload plate 513S, the preload plate 683S includes a ring-shaped portion 683a (an example of the ring-shaped portion) formed in a ring shape and axis alignment portions 683b (an example of the axis alignment portion) protruding radially outward from an outer periphery 683c of the ring-shaped portion 683a for axis alignment. In FIG. 12, the boundary between the ring-shaped portion 683a and each axis alignment portion 683b is shown by the dotted line T1 on the preload plate 683S. The preload plate 683S is different from the preload plate 513S in that the axis alignment portions 683b of the preload plate 683S perform axis alignment by contacting the bottom piece 61. More specifically, the axis alignment portions 683b of the preload plate 683S protrude from the outer periphery of the ring-shaped portion 683a toward radially inward portions of the lugs 65. The axis alignment portions 683b thus contact the radially inward portions of the lugs 65, whereby axis alignment is made.

The ring-shaped portion 683a has a shape similar to that of the ring-shaped portion 513a shown in FIG. 5. This means that the ring-shaped portion 683a has a non-uniform radial width. The outer periphery 683c (an example of the outer periphery) of the ring-shaped portion 683a has a round shape, and an inner periphery 683d (an example of the inner periphery) of the ring-shaped portion 683a has an elliptical shape. In FIG. 12, the circle center of the outer periphery 683c is depicted by the point O, and its radius is depicted by the dotted arrow T2. As a result of the ring-shaped portion 683a having the above shape, the ring-shaped portion 683a has a maximum width portion 683e, where its radial width becomes the largest width W1, and a minimum width portion 683f, where its radial width becomes the smallest width W2.

In the example shown in FIG. 12, four axis alignment portions 683b are arranged in the circumferential direction at 90 degrees intervals. Unlike the shape shown in FIG. 5, each axis alignment portion 683b includes a contacting portion 683b1 contacting the lugs 65 and a connecting portion 683b2 connecting the ring-shaped portion 683a and the contacting portion 683b1.

The circumferential length of the contacting portion 683b1 of each axis alignment portion 683b is longer than the circumferential length of each lug 65 and/or the circumferential length between two lugs 65. There is a gap between two lugs 65. So if the circumferential length of each contacting portion 683b1 is shorter than the circumferential length between two lugs 65, the contacting portion 683b1 may get into the gap, which makes axis alignment impossible. To prevent the contacting portion 683b1 from getting into the gap, the circumferential length of each contacting portion 683b1 is made longer than the circumferential length between two lugs 65. Further, making the circumferential length of each contacting portion 683b1 longer than the circumferential length of each lug 65 can ensure stable contact between the contacting portions 683b1 and the lugs 65. Alternatively, the four contacting portions 683b1 may be connected to each other in the circumferential direction so as to form a ring shape.

[Effects of the Preload Plate 513S and the Preload Plate 683S]

Figure 13A:
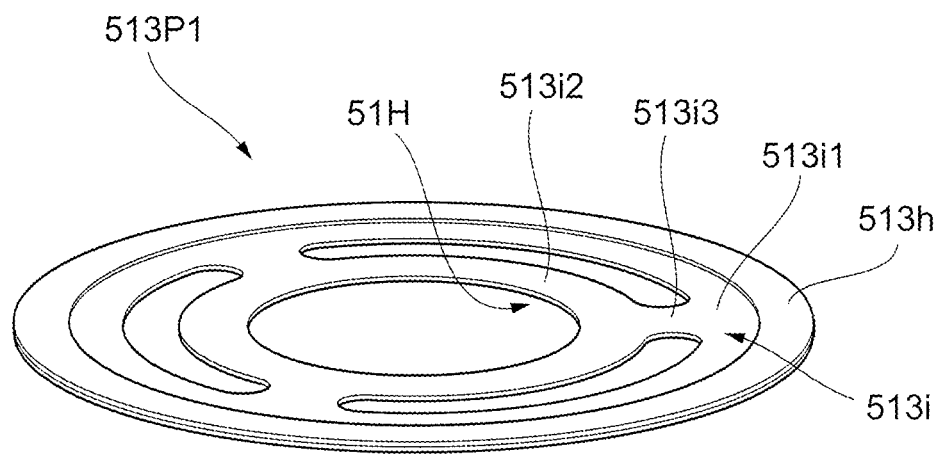
FIGS. 13A and 13B show conventional preload plates used in the extension-side damping valve.
Figure 13B:
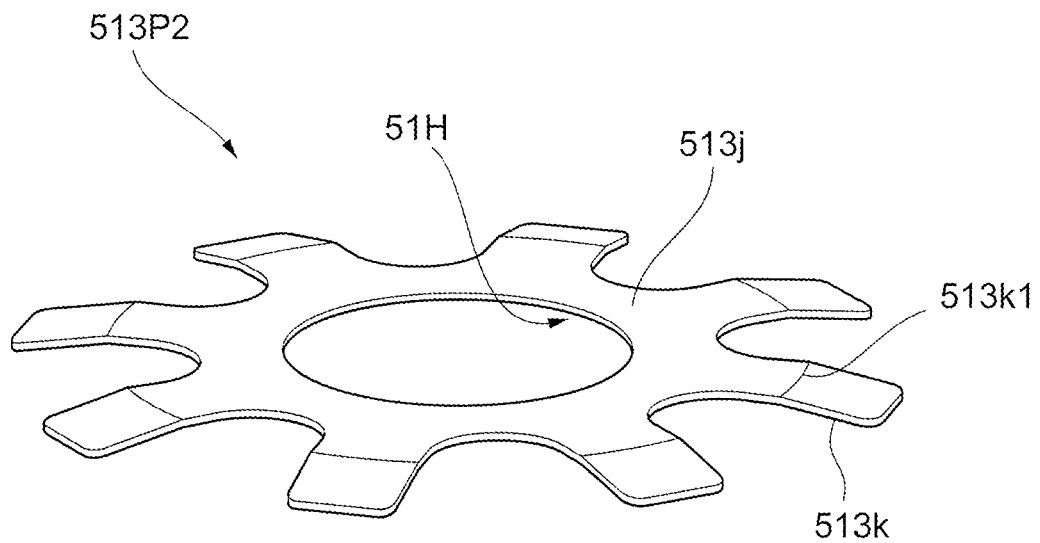

FIGS. 13A and 13B show conventional preload plates used in the extension-side damping valve 51.

The preload plate 513P1 shown in FIG. 13A includes an outer periphery plate 513h on the outer periphery side and an inner periphery plate 513i on the inner periphery side. The outer periphery plate 513h and the inner periphery plate 513i are welded to each other, and there is a level difference between them. Preload is applied to the valve plate 511 using this level difference.

The inner periphery plate 513i includes: an outer periphery-side ring 513i1 on the outer periphery side and welded to the outer periphery plate 513h; an inner periphery-side ring 513i2 on the inner periphery side; and a connecting portion 513i3 connecting the outer periphery-side ring 513i1 and the inner periphery-side ring 513i2. The inner periphery of the inner periphery-side ring 513i2 defines the above-described opening 51H and contacts the piston rod 21. This means that this preload plate 513P1 performs the axis alignment by its inner periphery defining the opening 51H.

The preload plate 513P1, however, requires welding and has a complicated structure, which leads to increased manufacturing steps. This in turn leads to increased manufacturing costs.

The preload plate 513P2 shown in FIG. 13B includes an inner periphery member 513j on the inner periphery side and multiple protruding members 513k protruding from the inner periphery member 513j to the outer periphery side. Each protruding member 513k is bent at a folding portion 513k1 as a folding line. In the example shown in the figure, each folding portion 513k1 forms a projection. Using a level difference created by this projection, preload is applied to the valve plate 511.

In this case, the inner periphery side of the inner periphery member 513j defines the above-described opening 51H and contacts the piston rod 21. This means that this preload plate 513P2 also performs the axis alignment by its inner periphery defining the opening 51H.

However, in bending this preload plate 513P2, the height of the projections formed by the respective folding portions 513k1 tend to fluctuate. This leads to the problem that the size of preload tends to fluctuate in the circumferential direction. Also, this preload plate 513P2, which requires bending of the folding portions 513k1, has a complicated structure and involves increased manufacturing steps. This in turn leads to increased manufacturing costs.

As another example, a protrusion (boss) may be provided on the piston body 30, and the preload may be applied using a level difference created by this protrusion and using rigidity of the plates constituting the extension-side damping valve 51. In this method, however, creating a large level difference may cause buckling of the plates in the circumferential direction. Also, the size of the preload tends to fluctuate in this method.

In still another example, a coil spring may be provided to apply the preload. However, this requires a space for the coil spring and leads to a complicated structure.

To the contrary, the preload plate 513S of the present embodiment performs the axis alignment by its outer periphery side, not by its inner periphery side. This eliminates the need for performing the axis alignment by the inner periphery 513*d* of the ring-shaped portion 513*a*, which makes it possible to position the inner periphery 513*d* closer to the outer periphery side. If the preload plate 513S performs the axis alignment using the piston rod 21, its inner periphery 513*d* needs to be extended toward the inner periphery side until the inner periphery 513*d* contacts the piston rod 21. This results in the shape as shown in FIGS. 13A and 13B. If this preload plate 513S has a uniform thickness, the preload plate 513S does not create any level difference. This, as a result, necessitates creating the level difference by welding two plates as shown in FIG. 13A or by bending the plate as shown in FIG. 13B. In contrast, the present embodiment can create the level difference with a simpler structure.

Further, the present embodiment allows to easily change the size of preload by changing the thickness of the preload plate 513S. This enables application of either strong or weak preload, allowing for more flexible settings.

The preload plate 513S of the present embodiment is composed of a single plate, and thus can be manufactured by punching a metal plate, for example. This can reduce the number of manufacturing steps, helping to reduce manufacturing costs.

The thickness of the preload plate 513S of the present embodiment can more easily be made uniform, which makes it easy to create a uniform level difference. As a result, this can reduce fluctuation in size of the preload in the circumferential direction.

The preload plate 513S of the present embodiment occupies a smaller space as compared to the method using a coil spring, and also has a simple structure.

The ring-shaped portion 513*a* has a shape other than a circular shape and/or the axis alignment portions 513*b* have different sizes or shapes. This allows the valve plate 511 to gradually open with increase in pressure of the oil. This avoids sudden changes in damping force, preventing occurrence of noise.

The above description of the effects of the preload plate 513S also applies to the preload plate 683S.

Figure 14:
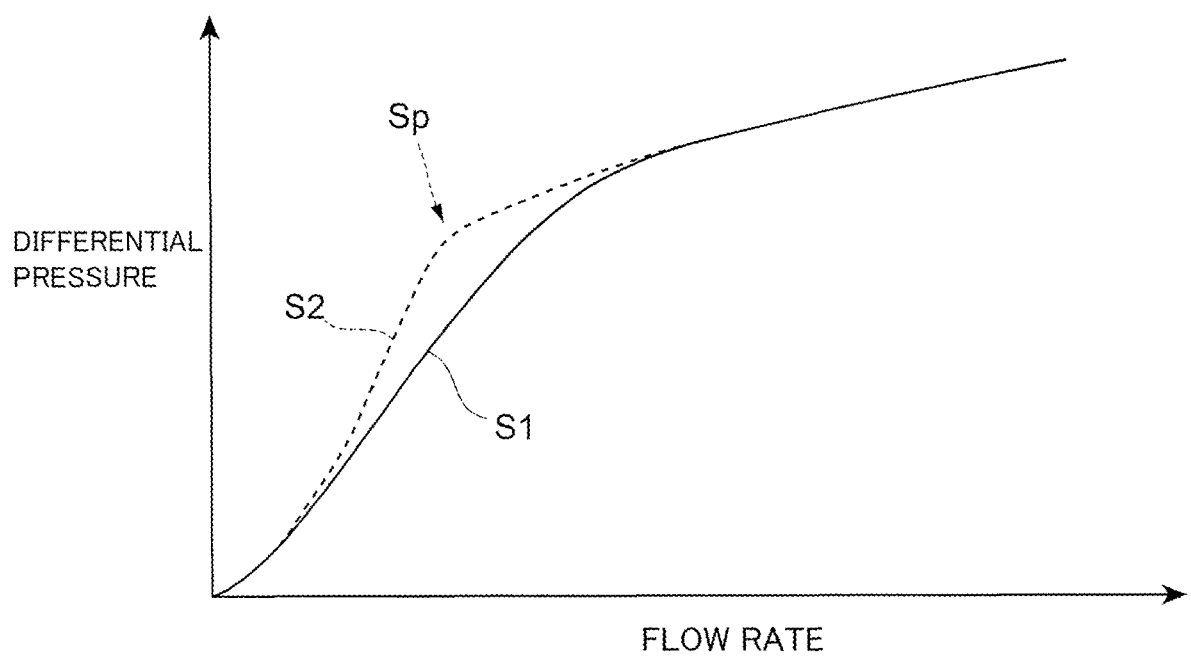
FIG. 14 shows comparison of damping force characteristics between the preload plate of the present embodiment and a conventional preload plate.

FIG. 14 shows comparison of damping force characteristics between the preload plate 513S of the present embodiment and a conventional preload plate.

The horizontal axis represents the oil flow rate, and the vertical axis represents the differential pressure. The relationship between the oil flow rate and the differential pressure represents the damping characteristics.

The solid line S1 represents the damping characteristics when the preload plate 513S of the present embodiment is used. The dotted line S2 represents the damping characteristics when a conventional preload plate is used.

Here, a more linear relationship between the oil flow rate and the differential pressure means less sudden changes occurring in the damping force. When the conventional preload plate is used, the damping force suddenly changes at a point Sp as depicted by the dotted line S2. In contrast, use of the preload plate 513S of the present embodiment results in more linear damping characteristics, causing no sudden changes in the damping force.

In the above example, the preload plate 513S or the preload plate 683S is positioned on the third layer. The present invention is, however, not limited to this. The preload plate 513S or the preload plate 683S may be positioned on any layer as long as they are positioned closer to the one side relative to the valve plate 511 or the valve plate 681. The size of the preload can be varied depending on which layer the valve plate 511 or the valve plate 681 is positioned on.

In the above example, the preload plate 513S is used in the extension-side damping valve 51, and the preload plate 683S is used in the compression-side damping valve 68. However, the preload plate of the present embodiment may be used in either the extension-side damping valve 51 or the compression-side damping valve 68.

In the above example, the preload plate 513S is used in the extension-side damping valve 51, but the preload plate 513S may be used in the compression-side damping valve 41. Also, in the above example, the preload plate 683S is used in the compression-side damping valve 68, but the preload plate 683S may be used in the check valve 64.

Depending on the shape of the lugs 65, the above-described preload plate 513S may be used in the compression-side damping valve 68. Also, the above-described preload plate 683S may be used in the extension-side damping valve 51.

REFERENCE SIGNS LIST

1 Hydraulic shock absorber
11 First cylinder (example of the cylinder)
21 Piston rod (an example of the rod)
30 Piston body (an example of the channel forming part and the piston body)
38 Annular protrusion (an example of the first protrusion and the protrusion)
51 Extension-side damping valve (an example of the opening and closing part)
312 Extension-side oil path (an example of the channel)
511, 681 Valve plate (an example of the opening and closing part)
513S, 683S Preload plate (an example of the preload member)
513U, 683U Level-difference adjusting plate (an example of the level-difference adjusting member)
513*a*, 683*a* Ring-shaped portion (an example of the ring-shaped portion)
513*b*, 683*b* Axis alignment portion (an example of the axis alignment portion)
514, 684 First pressing plate (an example of the first pressing member)
516, 686 Second pressing plate (an example of the second pressing member)
61 Bottom piece (an example of the channel forming part and the bottom piece)
65 Lug (an example of the second protrusion and the protrusion)
68 Compression-side damping valve (an example of the opening and closing part)

61d Compression-side oil path (an example of the channel)
100 Piston unit (an example of the damping force generation mechanism)

The invention claimed is:

1. A hydraulic shock absorber comprising:
a cylinder containing fluid;
a channel forming part including a channel configured to allow for flow of the fluid along with relative movement of a rod in an axial direction of the cylinder; and
an opening and closing part configured to open and close the channel of the channel forming part,
wherein the opening and closing part includes:
an opening and closing member configured to have a circular ring shape, close the channel by covering the channel and open the channel by deforming an outer periphery thereof under pressure of the fluid; and
a preload member configured to apply a preload to the opening and closing member, the preload member including a ring-shaped portion and axis alignment portions, the ring-shaped portion being in a ring shape and including an inner periphery in a shape other than a circular shape, the axis alignment portions being configured to protrude from an outer periphery of the ring-shaped portion and contact the channel forming part to thereby perform axis alignment,
wherein the channel forming part comprises a piston body that is attached to a distal end of the rod, said piston body including a first protrusion having a cylindrical shape and protruding in the axial direction, and
wherein the axis alignment portions of the preload member are configured to perform the axis alignment by contacting a radially inward portion of the first protrusion.

2. The hydraulic shock absorber according to claim 1, wherein the ring-shaped portion is in a shape other than a circular ring shape.

3. The hydraulic shock absorber according to claim 2, wherein the ring-shaped portion includes an outer periphery in a shape other than a round shape, so that the ring-shaped portion has a non-uniform radial width.

4. The hydraulic shock absorber according to claim 2, wherein the ring-shaped portion has a non-uniform radial width.

5. The hydraulic shock absorber according to claim 4, wherein the ring-shaped portion includes an outer periphery in a round shape, so that the ring-shaped portion has the non-uniform radial width.

6. The hydraulic shock absorber according to claim 5, wherein the inner periphery is in an elliptical shape.

7. A hydraulic shock absorber comprising:
a cylinder containing fluid;
a channel forming part including a channel configured to allow for flow of the fluid along with relative movement of a rod in an axial direction of the cylinder; and
an opening and closing part configured to open and close the channel of the channel forming part,
wherein the opening and closing part includes:
an opening and closing member configured to have a circular ring shape, close the channel by covering the channel and open the channel by deforming an outer periphery thereof under pressure of the fluid; and
a preload member configured to apply a preload to the opening and closing member, the preload member including a ring-shaped portion and axis alignment portions, the ring-shaped portion being in a ring shape, the axis alignment portions being configured to protrude from an outer periphery of the ring-shaped portion and contact the channel forming part to thereby perform axis alignment, and
a level-difference adjusting member provided on an inside of the preload member in a radial direction, the level-difference adjusting member being configured to adjust a level-difference created by the preload member.

8. The hydraulic shock absorber according to claim 7, wherein the level-difference adjusting member has a thickness smaller than a thickness of the preload member.

9. The hydraulic shock absorber according to claim 7, further comprising:
a first pressing member configured to press the preload member against the opening and closing member; and
a second pressing member configured to press radially inward portions of the opening and closing member, the level-difference adjusting member, and the first pressing member against the channel forming part.

10. The hydraulic shock absorber according to claim 9, wherein each of the opening and closing member, the level-difference adjusting member, the first pressing member, and the second pressing member is in a ring shape and configured to perform axis alignment by an inner periphery of the ring shape.

* * * * *